United States Patent
Ito et al.

(10) Patent No.: US 12,107,260 B2
(45) Date of Patent: Oct. 1, 2024

(54) ALL SOLID BATTERY AND DETECTING METHOD OF END POINT VOLTAGE OF THE SAME

(71) Applicant: TAIYO YUDEN CO., LTD., Tokyo (JP)

(72) Inventors: Daigo Ito, Tokyo (JP); Taiki Suematsu, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 149 days.

(21) Appl. No.: 17/327,471

(22) Filed: May 21, 2021

(65) Prior Publication Data
US 2021/0408531 A1    Dec. 30, 2021

(30) Foreign Application Priority Data

Jun. 29, 2020    (JP) ................................. 2020-111751
Jun. 29, 2020    (JP) ................................. 2020-111789

(51) Int. Cl.
*H01M 4/36*    (2006.01)
*H01M 4/34*    (2006.01)
(Continued)

(52) U.S. Cl.
CPC ............... *H01M 4/34* (2013.01); *H01M 4/48* (2013.01); *H01M 4/5825* (2013.01);
(Continued)

(58) Field of Classification Search
None
See application file for complete search history.

(56) References Cited

U.S. PATENT DOCUMENTS

2007/0259271 A1   11/2007   Nanno et al. ................. 429/318
2009/0214957 A1*   8/2009   Okada ................. H01M 4/5825
                                                                                           429/319

(Continued)

FOREIGN PATENT DOCUMENTS

CN       103718345 A    4/2014
JP       2005-174686 A    6/2005

(Continued)

OTHER PUBLICATIONS

Gellert et al., Ionics, 2018, 24, 1001-1006. (Year: 2018).*

(Continued)

*Primary Examiner* — Zhongqing Wei
(74) *Attorney, Agent, or Firm* — Stein IP LLC

(57) ABSTRACT

An all solid battery includes an oxide-based solid electrolyte layer, a positive electrode layer that is provided on a first main face of the oxide-based solid electrolyte layer and includes a positive electrode active material, and a negative electrode layer that is provided on a second main face of the oxide-based solid electrolyte layer and includes a negative electrode active material. At least one of the positive electrode active material of the positive electrode layer and the negative electrode active material of the negative electrode layer includes a first electrode active material and a second electrode active material of which average operation potentials (vs $Li/Li^+$) are different from each other.

9 Claims, 11 Drawing Sheets

(51) Int. Cl.
  *H01M 4/48* (2010.01)
  *H01M 4/58* (2010.01)
  *H01M 10/0525* (2010.01)
  *H01M 4/02* (2006.01)

(52) U.S. Cl.
  CPC .. *H01M 10/0525* (2013.01); *H01M 2004/021* (2013.01); *H01M 2004/027* (2013.01); *H01M 2004/028* (2013.01)

(56) References Cited

U.S. PATENT DOCUMENTS

| | | | | |
|---|---|---|---|---|
| 2014/0134483 | A1* | 5/2014 | Ouchi | H01M 6/188 |
| | | | | 429/209 |
| 2014/0170450 | A1 | 6/2014 | Takahashi et al. | 429/62 |
| 2015/0372298 | A1* | 12/2015 | Fujieda | C03C 3/21 |
| | | | | 429/246 |
| 2020/0381775 | A1* | 12/2020 | Fujii | H01M 4/525 |

FOREIGN PATENT DOCUMENTS

| | | |
|---|---|---|
| JP | 2007-005279 A | 1/2007 |
| JP | 2013-065453 A | 4/2013 |
| JP | 2017-157394 A | 9/2017 |
| JP | 2019-169314 A | 10/2019 |
| WO | WO 2012/060349 A1 | 5/2012 |
| WO | WO 2014/038311 A1 | 3/2014 |

OTHER PUBLICATIONS

Notice of Reasons for Refusal dated Mar. 19, 2024, issued by the Japanese Patent Office in corresponding application JP 2020-111751.

Notification of First Office Action dated Feb. 1, 2024, issued by the China National Intellectual Property Administration in corresponding application CN 202110711459.2.

Notification of Reasons for Refusal issued on Jul. 2, 2024 in a counterpart Japanese Patent Application No. 2020-111789.

Notification of Reasons for Refusal was issued on Jul. 2, 2024 in a counterpart Japanese Patent Application No. 2020-111751.

\* cited by examiner

ALL SOLID BATTERY AND DETECTING METHOD OF END POINT VOLTAGE OF THE SAME

CROSS-REFERENCE TO RELATED APPLICATION

This application is based upon and claims the benefit of priority of the prior Japanese Patent Application No. 2020-111751, filed on Jun. 29, 2020 and the prior Japanese Patent Application No. 2020-111789, filed on Jun. 29, 2020, the entire contents of which are incorporated herein by reference.

FIELD

A certain aspect of the present invention relates to an all solid battery and a detecting method of an end point voltage of the all solid battery.

BACKGROUND

Recently, secondary batteries are being used in various fields. Secondary batteries having electrolytic liquid have a problem such as leak of the electrolytic liquid. And so, all solid batteries having a solid electrolyte and other solid elements are being developed.

A potential window of the solid electrolyte is wider than that of electrolyte liquid. Therefore, the solid electrolyte has wide voltage stability. There are many types of solid electrolyte to which a positive electrode active material of 5V order can be applied. For example, $LiCoPO_4$ (for example, Japanese Patent Application Publication No. 2007-005279) and $Li_2CoP_2O_7$ (for example, Japanese Patent Application Publication No. 2017-157394) are positive electrode active materials which can operate at approximately 5V vs $Li/Li^+$. When the active materials are used, it is possible to increase a cell voltage. It is expected to use cells having the active materials instead of button cell which operates at 3V or more.

An oxide-based solid electrolyte achieving high ionic conductivity by sintering has a larger potential window than that of electrolyte liquid or other solid electrolyte. And the oxide-based solid electrolyte is relatively stable in normal atmosphere. For example, there is disclosed an all solid battery which is formed by co-sintering of an on oxide-based solid electrolyte and a negative electrode active material (for example, see International Publication No. 2014/038311).

SUMMARY OF THE INVENTION

According to an aspect of the present invention, there is provided an all solid battery including: an oxide-based solid electrolyte layer; a positive electrode layer that is provided on a first main face of the oxide-based solid electrolyte layer and includes a positive electrode active material; and a negative electrode layer that is provided on a second main face of the oxide-based solid electrolyte layer and includes a negative electrode active material, wherein at least one of the positive electrode active material of the positive electrode layer and the negative electrode active material of the negative electrode layer includes a first electrode active material and a second electrode active material of which an average operation potentials (vs $Li/Li^+$) is different from an average operation potential (vs $Li/Li^+$) of the first electrode active material.

According to another aspect of the present invention, there is provided a detecting method of an end point voltage of an all solid battery including: as an end point voltage, detecting a second terrace in a discharge curve in which a horizontal axis indicates a discharge amount (capacity/$\mu Ah$) and a vertical axis indicates a cell voltage, the second terrace appearing after a first terrace appearing just after starting of discharge, a cell voltage of the second terrace being lower than a cell voltage of the first terrace, wherein the all solid battery comprises: an oxide-based solid electrolyte layer; a positive electrode layer that is provided on a first main face of the oxide-based solid electrolyte layer and includes a positive electrode active material; and a negative electrode layer that is provided on a second main face of the oxide-based solid electrolyte layer and includes a negative electrode active material, wherein at least one of the positive electrode active material of the positive electrode layer and the negative electrode active material of the negative electrode layer includes a first electrode active material and a second electrode active material of which an average operation potential (vs $Li/Li^+$) is different from an average operation potential (vs $Li/Li^+$) of the first electrode active material.

DETAILED DESCRIPTION

For example, it is favorable that a device such as an IC (Integrated Circuit) is controlled sot that a cell voltage of an all solid battery is not reduced to 1.8 V or less. And so, many all solid batteries are devised. For example, an end point voltage (lower limit voltage) is set. And, charge is performed when a monitored cell voltage reduced to an end point voltage. In a discharge curve of a general cell, near an end point where a battery remaining amount is small, an inclination rapidly becomes larger than an inclination of a potential terrace. When the voltage decreases in a short time, it is difficult to detect the end point voltage.

A description will be given of an embodiment with reference to the accompanying drawings.

Figure 1:
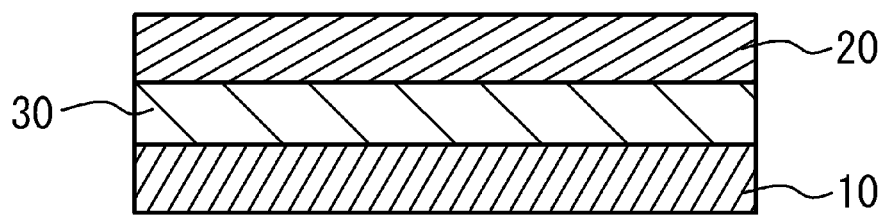
FIG. 1 illustrates a schematic cross section of a basic structure of an all solid battery.

(First embodiment) FIG. 1 illustrates a schematic cross section of a basic structure of an all solid battery 100 in accordance with an embodiment. As illustrated in FIG. 1, the all solid battery 100 has a structure in which a first internal electrode 10 and a second internal electrode 20 sandwich a solid electrolyte layer 30. The first internal electrode 10 is provided on a first main face of the solid electrolyte layer 30. The second internal electrode 20 is provided on a second main face of the solid electrolyte layer 30.

When the all solid battery 100 is used as a secondary battery, one of the first internal electrode 10 and the second internal electrode 20 is used as a positive electrode and the other is used as a negative electrode. In the embodiment, as an example, the first internal electrode 10 is used as a positive electrode, and the second internal electrode 20 is used as a negative electrode.

A main component of the solid electrolyte layer 30 is solid electrolyte having ionic conductivity. The solid electrolyte of the solid electrolyte layer 30 is an oxide-based solid electrolyte having lithium ion conductivity. The solid electrolyte is phosphoric acid salt-based electrolyte having a NASICON structure. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the first internal electrode 10 and the second internal electrode 20 is added in advance, is used. For example, when the first internal electrode 10 and the second internal electrode 20 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte. When the first internal electrode 10 and the second internal electrode 20 include phosphoric acid salt including Li and a transition metal other than Co, it is preferable that the solid electrolyte layer 30 includes Li—Al—Ge—$PO_4$-based material in which the transition metal is added in advance.

At least, the first internal electrode 10 used as a positive electrode includes a material having an olivine type crystal structure, as an electrode active material. It is preferable that the second internal electrode 20 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the first internal electrode 10 acting as a positive electrode. For example, when only the first internal electrode 10 includes the electrode active material having the olivine type crystal structure, the electrode active material acts as the positive electrode active material. When the second internal electrode 20 also includes an electrode active material having the olivine type crystal structure, discharge capacity may increase and an operation voltage may increase because of electric discharge, in the second internal electrode 20 acting as a negative electrode. The function mechanism is not completely clear. However, the mechanism may be caused by partial solid-phase formation together with the negative electrode active material.

When both the first internal electrode 10 and the second internal electrode 20 include an electrode active material having the olivine type crystal structure, the electrode active material of each of the first internal electrode 10 and the second internal electrode 20 may have a common transition metal. Alternatively, the a transition metal of the electrode active material of the first internal electrode 10 may be different from that of the second internal electrode 20. The first internal electrode 10 and the second internal electrode 20 may have only single type of transition metal. The first internal electrode 10 and the second internal electrode 20 may have two or more types of transition metal. It is preferable that the first internal electrode 10 and the second internal electrode 20 have a common transition metal. It is more preferable that the electrode active materials of the both electrode layers have the same chemical composition. When the first internal electrode 10 and the second internal electrode 20 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second internal electrode 20 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second internal electrode 20. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first internal electrode 10 and the second internal electrode 20, moreover, oxide-based solid electrolyte material or a conductive material (conductive auxiliary agent) such as a carbon material or a metal material may be added. When the material is evenly dispersed into water or organic solution together with binder or plasticizer, paste for electrode layer is obtained. In the embodiment, a carbon material is used as the conductive auxiliary agent. A metal material may be used as the auxiliary agent, in addition to the carbon material. Pd, Ni, Cu, or Fe, or an alloy thereof may be used as the metal material of the conductive auxiliary agent. For example, the electrolyte of the first internal electrode 10 and the second internal electrode 20 may be the same as the main component solid electrolyte of the solid electrolyte layer 30.

Figure 2:
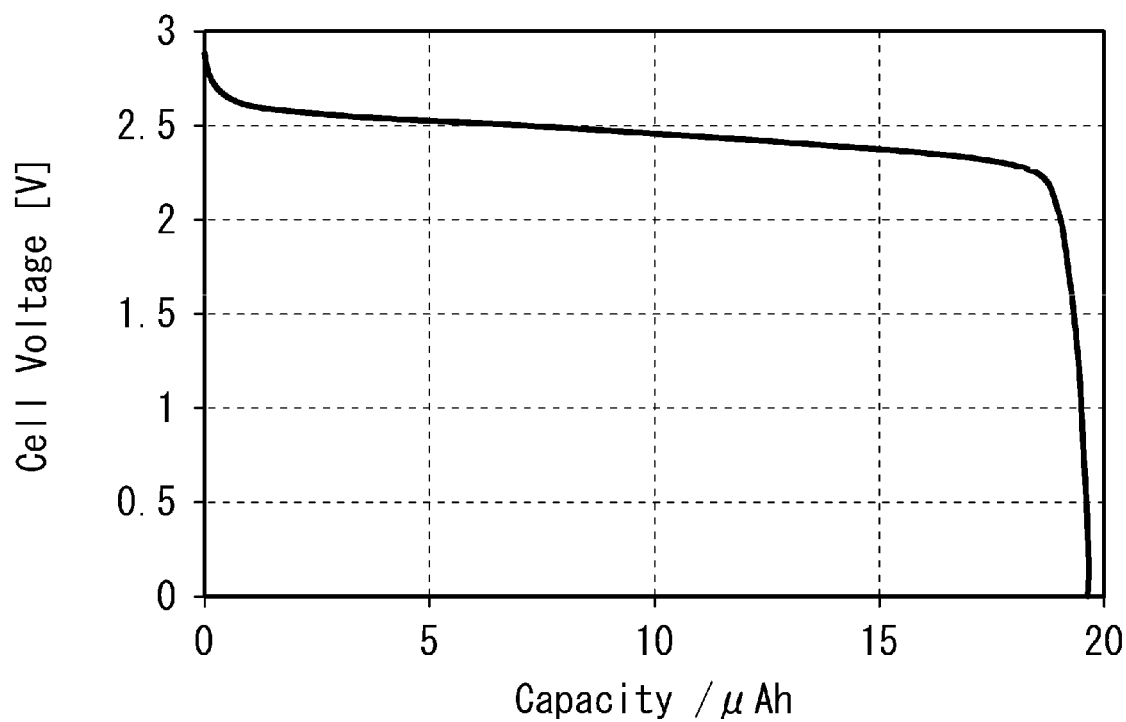
FIG. 2 illustrates a discharge curve in a case where a positive electrode incudes a single type of a positive electrode active material.

A description will be given of a case where the first internal electrode 10 includes a single type of the positive electrode active material. FIG. 2 illustrates a discharge curve of the first internal electrode 10 in this case. In FIG. 2, a horizontal axis indicates a discharge amount (capacity/μAh). A vertical axis indicates a cell voltage. As illustrated in FIG. 2, even if the discharge progresses, the cell voltage is approximately constant. Therefore, an inclination of the cell voltage with respect to the discharge amount is small. However, near an end point of the discharge where a battery remaining amount is small, the inclination of the cell voltage with respect to the discharge amount rapidly becomes large. Therefore, the cell voltage rapidly becomes small. In this case, even if charging is started after detecting the end point voltage, the cell voltage may become much smaller than the end point voltage. It is therefore difficult to detect the end point.

And so, in the embodiment, the first internal electrode 10 includes at least two types of positive electrode active materials of which average operation potentials (vs Li/Li$^+$) are different from each other. For example, in the two types of the positive electrode active materials, at least one of components and composition ratios are different from each other. One of the positive electrode active materials of which the average operation potential is higher is referred to as a first positive electrode active material. The other of the positive electrode active materials of which the average operation potential is lower is referred to as a second positive electrode active material. The average operation potential is an average cell voltage in the discharge range of 10% to 90% in a case where a current capacity is 100% in a case where a half-cell (metal lithium is located at an opposite pole) including an electrode active material and electrolytic liquid is discharged to 3 V at 0.05 C from full charge.

Figure 3:
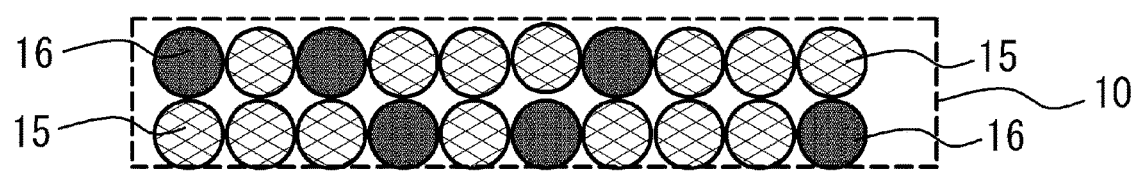
FIG. 3 schematically illustrates a cross sectional view of a first internal electrode.

FIG. 3 schematically illustrates a cross sectional view of the first internal electrode 10. As illustrated in FIG. 3, in the first internal electrode 10, crystal grains of the first positive electrode active material 15 and crystal grains of the second positive electrode active material 16 are randomly located. Actually, the first internal electrode 10 includes a solid electrolyte and a conductive auxiliary agent. However, in FIG. 3, the solid electrolyte and the conductive auxiliary agent are not illustrated.

Figure 4:
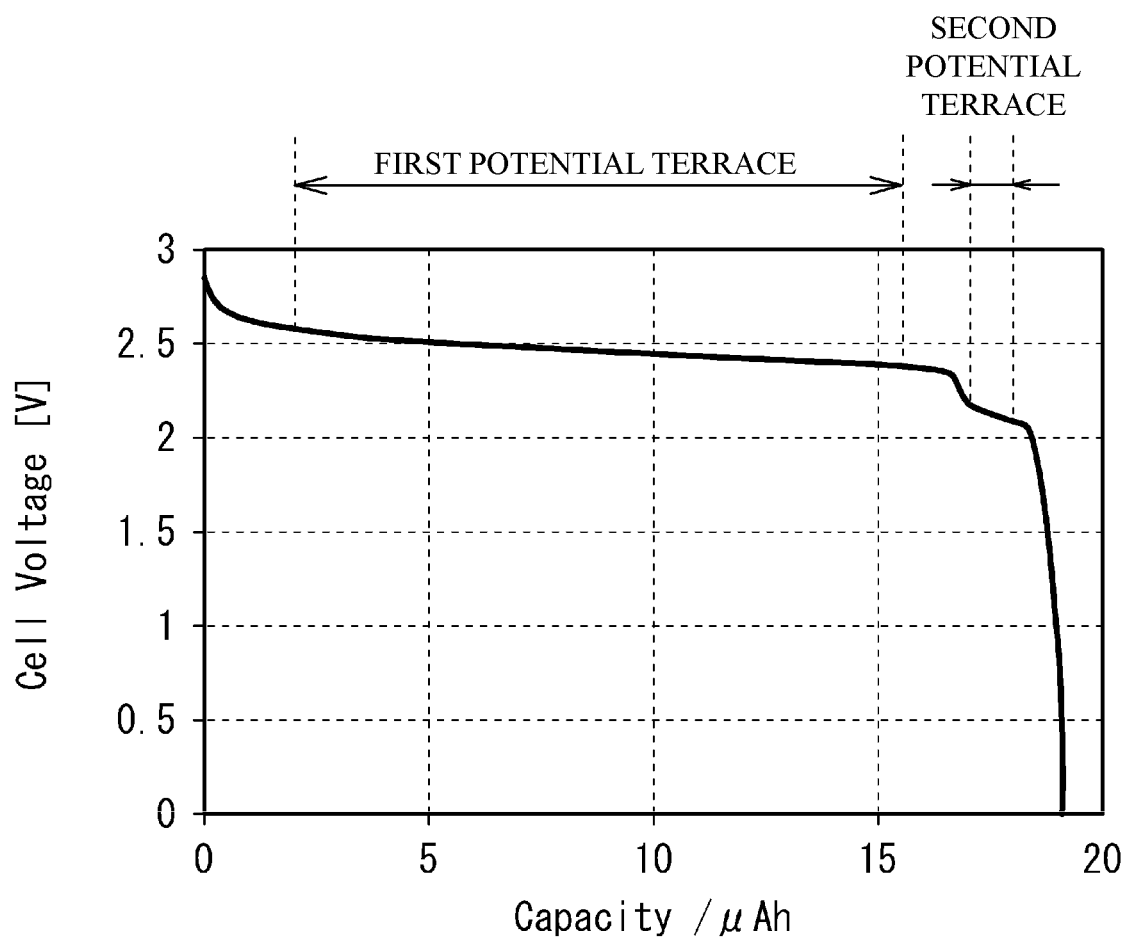
FIG. 4 illustrates a discharge curve of a first internal electrode in a case where the first internal electrode includes a first positive electrode active material and a second positive electrode active material.

FIG. 4 illustrates a discharge curve in the first internal electrode 10 in a case where the first internal electrode 10 includes the first positive electrode active material 15 and the second positive electrode active material 16. As illustrated in FIG. 4, after starting of the discharge, a first potential terrace appears. In the first potential terrace, a reduction degree (inclination) of the cell voltage with respect to the discharge amount is smaller than a threshold. The first potential terrace is caused by the first positive electrode active material. When the discharge progresses and the reduction degree (inclination) of the cell voltage with respect to the discharge amount becomes large, a second potential terrace appears. In the second potential terrace, a reduction degree (inclination) of the cell voltage with respect to the discharge amount is smaller than a threshold. The second potential terrace is caused by the second positive electrode active material. After that, when the discharge progresses, the reduction degree of the cell voltage rapidly becomes large. The potential terrace is a range in which an absolute value of the inclination of the discharge curve is 2 mV/cap. % or less when the all current capacity during the discharge is 100 cap. %.

When the second potential terrace is detected as the end point voltage, it is possible to detect the end point voltage easily. Before the cell voltage becomes much smaller than the end point voltage, it is possible to start the charge. It is therefore possible to secure the necessary cell voltage.

When a difference between the average operation potential of the first positive electrode active material 15 (first average operation potential) and the average operation potential of the second positive electrode active material 16 (second average operation potential) is small, it may be difficult to detect the second average operation potential. And so, it is preferable that the difference between the first average operation potential and the second average operation potential has a lower limit. For example, it is preferable that the difference between the first average operation potential and the second average operation potential is 0.2 V or more. It is more preferable that the difference is 0.25 V or more. It is still more preferable that the difference is 0.3 V or more. On the other hand, when the difference between the first average operation voltage and the second average operation potential is large, the cell voltage may be small in accordance with the negative electrode active material of the second internal electrode 20. And so, it is preferable that the difference between the first average operation potential and the second average operation potential has an upper limit. For example, it is preferable that the difference between the first average operation potential and the second average operation potential is 1.5 V or less. It is more preferable that the difference is 1.0 V or less. It is still more preferable that the difference is 0.5 V or less.

For example, LiCoPO$_4$ or the like may be used as the first positive electrode active material 15. Li$_6$Co$_5$(P$_2$O$_7$)$_4$ or the like may be used as the second positive electrode active material 16. In this case, LiCoPO$_4$ has an average operation potential of 4.9 V vs Li/Li$^+$. Li$_6$Co$_5$(P$_2$O$_7$)$_4$ operates at a potential lower than the average operation potential by 0.3 V to 0.5 V. It is therefore possible to achieve a high cell voltage. And it is possible to detect the end point voltage easily because the difference of the average operation potentials is large.

When the average crystal grain diameter of the second positive electrode active materials 16 is excessively small, a mutual diffusion reaction may occur between two electrode active materials. When the average crystal grain diameter is excessively large, an operation rate of the electrode active material may be reduced or rate characteristics may be degraded. And so, it is preferable that the average crystal grain diameter of the second positive electrode active materials 16 has a lower limit and an upper limit. For example, it is preferable that the average crystal grain diameter of the second positive electrode active materials 16 is 0.5 μm or more and 50 μm or less. It is more preferable that the average crystal grain diameter is 1.0 μm or more and 30 μm or less. It is still more preferable that the average crystal grain diameter is 1.5 μm or more and 20 μm or less.

When the average crystal grain diameter of the first positive electrode active materials 15 is excessively small, a mutual diffusion reaction may occur between two electrode active materials. When the average crystal grain diameter of the first positive electrode active materials 15 is excessively large, an operation rate of the electrode active material may be degraded or rate characteristics may be degraded. And so, it is preferable that the average crystal grain diameter of the first positive electrode active materials 15 has a lower limit and an upper limit. For example, it is preferable that the average crystal grain diameter of the first positive electrode active materials 15 is 0.5 μm or more and 50 μm or less. It is more preferable that the average crystal grain diameter is 1.0 μm or more and 30 μm or less. It is still more preferable that the average crystal grain diameter is 1.5 μm or more and 20 μm or less.

When an amount of the first positive electrode active material 15 is excessively large, it may be difficult to detect the end point voltage. And so, it is preferable that the amount of the first positive electrode active material 15 has an upper limit. On the other hand, when the amount of the second positive electrode active material 16 is excessively large, the energy density may be reduced. And so, it is preferable that the amount of the second positive electrode active material 16 has a lower limit. For example, in a cross section of the first internal electrode 10, an area ratio of the first positive electrode active materials 15 with respect to a total area of the first positive electrode active materials 15 and the second positive electrode active materials 16 is 85% or more, 90% or more, or 95% or more. In a cross section of the first internal electrode 10, an area ratio of the second positive electrode active materials 16 with respect to the total area of the first positive electrode active materials 15 and the second positive electrode active materials 16 is 5% or more, 10% or more, or 15% or more.

It is preferable that the first internal electrode 10 further includes $Li_2CoP_2O_7$. In this case, the mutual reaction during the firing is suppressed. The cell reaction of $Li_6Co_5(P_2O_7)_4$ becomes even. And it is possible to clearly detect the terrace voltage.

Figure 5:
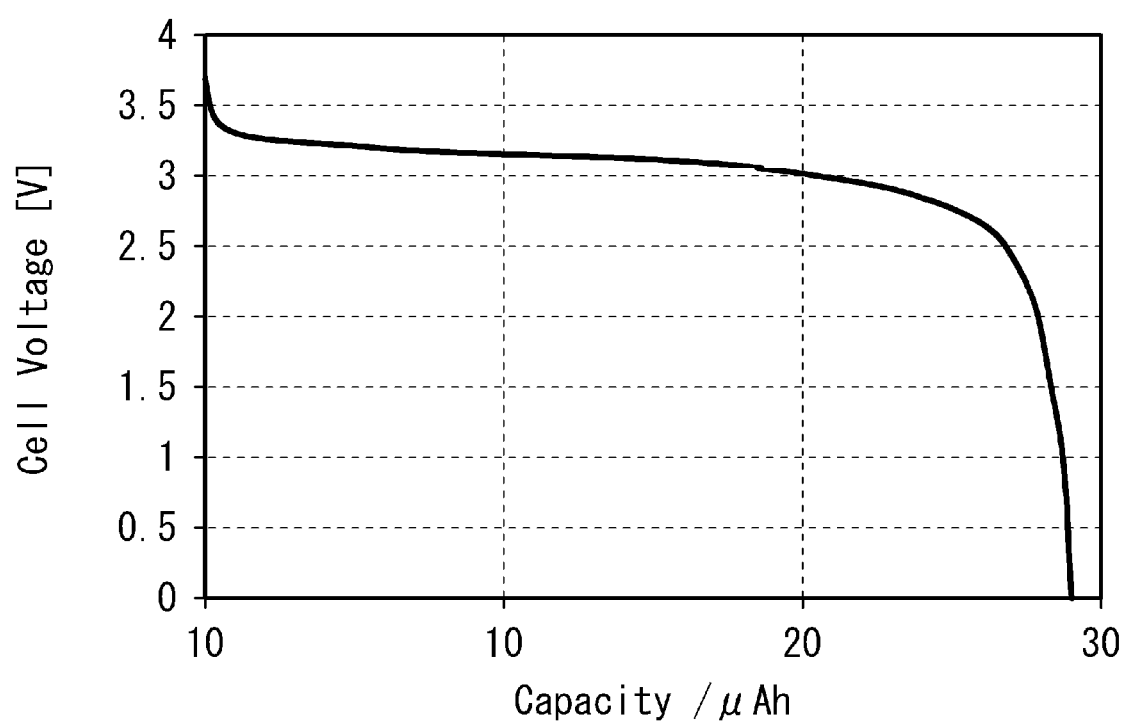
FIG. 5 illustrates a discharge curve in a case where a negative electrode includes a single type of a negative electrode active material.

(Second embodiment) A description will be given of a case where the second internal electrode 20 includes a single type of the negative electrode active material. FIG. 5 illustrates a discharge curve of the second internal electrode 20 in this case. In FIG. 5, a horizontal axis indicates a discharge amount (capacity/μAh). A vertical axis indicates a cell voltage. As illustrated in FIG. 5, even if the discharge progresses, the cell voltage is approximately constant. Therefore, an inclination of the cell voltage with respect to the discharge amount is small. However, near an end point of the discharge where a battery remaining amount is small, the inclination of the cell voltage with respect to the discharge amount rapidly becomes large. Therefore, the cell voltage rapidly becomes small. In this case, even if charging is started after detecting the end point voltage, the cell voltage may become much smaller than the end point voltage. It is therefore difficult to detect the end point.

And so, in the embodiment, the second internal electrode 20 includes at least two types of negative electrode active materials of which average operation potentials (vs $Li/Li^+$) are different from each other. For example, in the two types of the negative electrode active materials, at least one of components and composition ratios are different from each other. One of the negative electrode active materials of which the average operation potential is lower is referred to as a first negative electrode active material. The other of the negative electrode active materials of which the average operation potential is higher is referred to as a second negative electrode active material. The average operation potential is an average cell voltage in the discharge range of 10% to 90% in a case where a current capacity is 100% in a case where a half-cell (metal lithium is located at an opposite pole) including an electrode active material and electrolytic liquid is discharged (lithium is released) to 3 V at 0.05 C from full charge.

Figure 6:
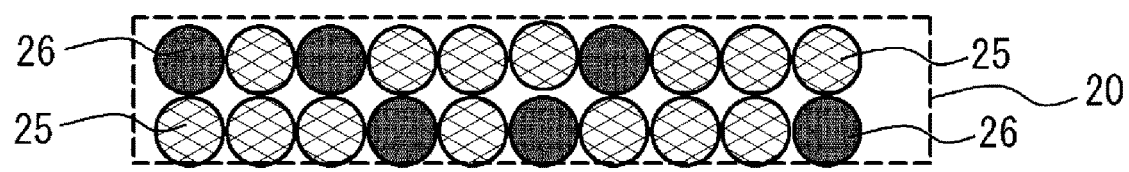
FIG. 6 schematically illustrates a cross sectional view of a second internal electrode.

FIG. 6 schematically illustrates a cross sectional view of the second internal electrode 20. As illustrated in FIG. 6, in the second internal electrode 20, crystal grains of the first negative electrode active material 25 and crystal grains of the second negative electrode active material 26 were randomly located. Actually, the second internal electrode 20 includes a solid electrolyte and a conductive auxiliary agent. However, in FIG. 6, the solid electrolyte and the conductive auxiliary agent are not illustrated.

Figure 7:
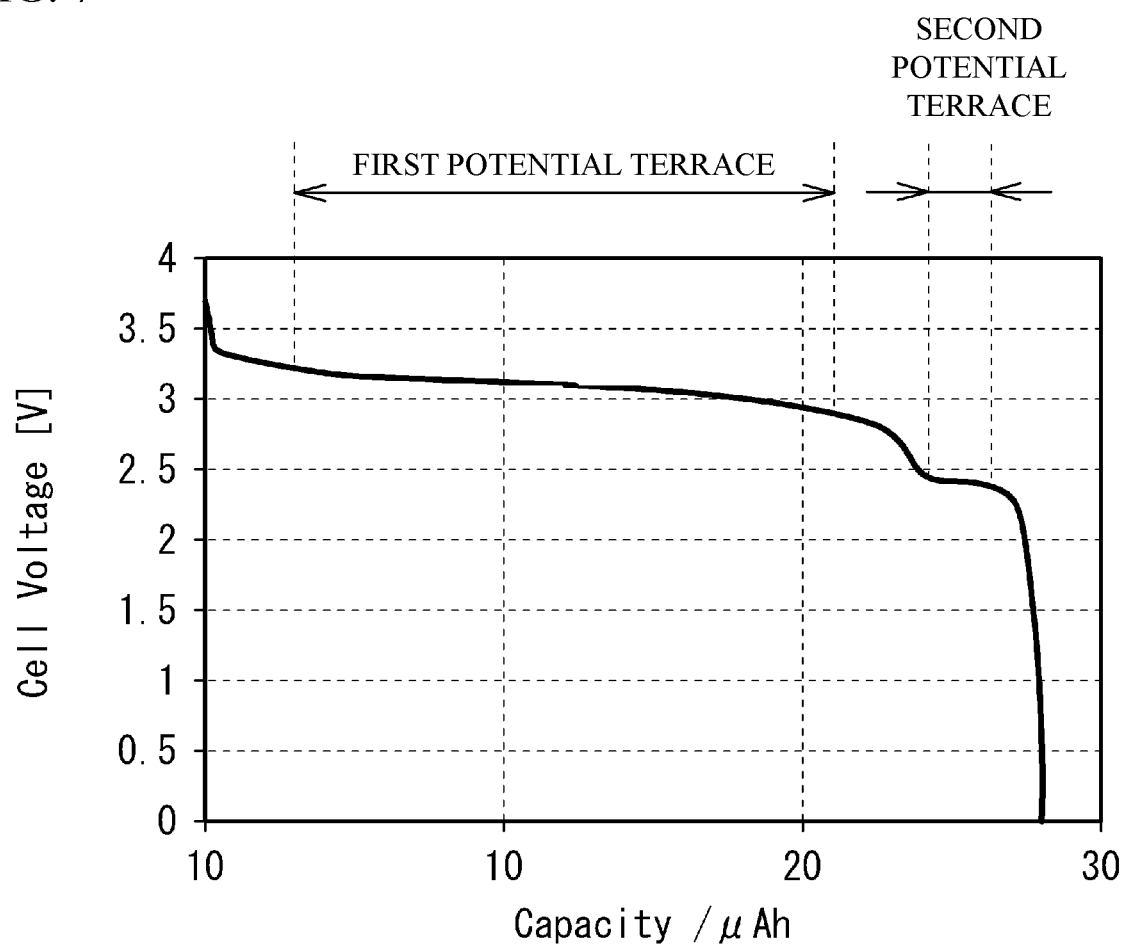
FIG. 7 illustrates a discharge curve of a second internal electrode in a case where the second internal electrode includes a first negative electrode active material and a second negative electrode active material.

FIG. 7 illustrates a discharge curve of the second internal electrode 20 in a case where the second internal electrode 20 includes the first negative electrode active material 25 and the second negative electrode active material 26. As illustrated in FIG. 7, after starting of the discharge, a first potential terrace appears. In the first potential terrace, a reduction degree (inclination) of the cell voltage with respect to the discharge amount is smaller than a threshold. The first potential terrace is caused by the first negative electrode active material. When the discharge progresses and the reduction degree (inclination) of the cell voltage with respect to the discharge amount becomes large, a second potential terrace appears. In the second potential terrace, a reduction degree (inclination) of the cell voltage with respect to the discharge amount is smaller than a threshold. The second potential terrace is caused by the second negative electrode active material. After that, when the discharge progresses, the reduction degree of the cell voltage rapidly becomes large. The potential terrace is a range in which an absolute value of the inclination of the discharge curve is 2 mV/cap. % or less when the all current capacity during the discharge is 100 cap. %.

When the second potential terrace is detected as the end point voltage, it is possible to detect the end point voltage easily. Before the cell voltage becomes much smaller than the end point voltage, it is possible to start the charge. It is therefore possible to secure the necessary cell voltage.

When a difference between the average operation potential of the first negative electrode active material 25 (first average operation potential) and the average operation potential of the second negative electrode active material 26 (second average operation potential) is small, it may be difficult to detect the second average operation potential. And so, it is preferable that the average operation potential of the first negative electrode active material 25 has an upper limit and the average operation potential of the second negative electrode active material has a lower limit. For example, the first average operation potential is 1.9 V or less. It is more preferable that the first average operation potential is 1.8 V or less. It is still more preferable that the first average operation potential is 1.7 V or less. It is preferable that the average operation potential of the second negative electrode active material is 2.2 V or more. It is more preferable that the average operation potential of the second negative electrode active material is 2.3 V or more. It is still more preferable that the average operation potential of the second negative electrode active material is 2.4 V or more. When the difference between the average operation potential of the first negative electrode active material 25 and the average operation potential of the second negative electrode active material 26 is excessively small, it is difficult to detect the average operation potential of the second negative electrode active material 26. It is therefore preferable that the difference is 0.3 V or more. It is more preferable that the difference is 0.5 V or more. It is still more preferable that the difference is 0.7 V or more.

For example, the first negative electrode active material 25 may be one of $TiO_2$, $Li_{1-2x}M_xTiOPO_4$ (M is a metal element of which a valence is 2, and $0 \leq x \leq 0.5$), $Li_{3x}La_{2/3-x}TiO_3$, $Nb_2O_5$, Nb—Ti—O based compound.

For example, the second negative electrode active material 26 may be phosphoric acid salt including Ti and having a NASICON type crystal structure, or $TiP_2O_7$. The phosphoric acid salt including Ti may be $Li_{1+y}A_yTi_{2-y}(PO_4)_3$ (A is a metal element of which a valence is 3, and $0 \leq y \leq 0.7$).

When the average crystal grain diameter of the second negative electrode active materials 26 is excessively small, a mutual diffusion reaction may occur between materials during a firing process. When the average crystal grain diameter is excessively large, an operation rate of the electrode active material may be reduced or rate characteristics may be degraded. And so, it is preferable that the average crystal grain diameter of the second negative electrode active materials 26 has a lower limit and an upper limit. For example, it is preferable that the average crystal grain diameter of the second negative electrode active materials 26 is 0.5 m or more and 50 μm or less. It is more preferable that the average crystal grain diameter is 1.0 μm or more and 30 μm or less. It is still more preferable that the average crystal grain diameter is 1.5 μm or more and 20 μm or less.

When the average crystal grain diameter of the first negative electrode active materials 25 is excessively small, a mutual diffusion reaction may occur between two electrode active materials. When the average crystal grain diameter of the first negative electrode active materials 25 is excessively large, an operation rate of the electrode active material may be degraded or rate characteristics may be degraded. And so, it is preferable that the average crystal grain diameter of the first negative electrode active materials 25 has a lower limit and an upper limit. For example, it is preferable that the average crystal grain diameter of the first negative electrode active material 25 is 0.5 μm or more and 50 μm or less. It is more preferable that the average crystal grain diameter is 1.0 μm or more and 30 μm or less. It is still more preferable that the average crystal grain diameter is 1.5 μm or more and 20 μm or less.

When an amount of the first negative electrode active material 25 is excessively large, it may be difficult to detect the end point voltage. And so, it is preferable that the amount of the first negative electrode active material 25 has an upper limit. On the other hand, when the amount of the second negative electrode active material 26 is excessively large, the energy density may be reduced. And so, it is preferable that the amount of the second negative electrode active material 26 has a lower limit. For example, in a cross section of the second internal electrode 20, an area ratio of the first negative electrode active materials 25 with respect to a total area of the first negative electrode active materials 25 and the second negative electrode active materials 26 is 85% or more, 90% or more, or 95% or more. In a cross section of the second internal electrode 20, an area ratio of the second negative electrode active materials 26 with respect to the total area of the first negative electrode active materials 25 and the second negative electrode active materials 26 is 5% or more, 10% or more, or 15% or more.

Figure 8:
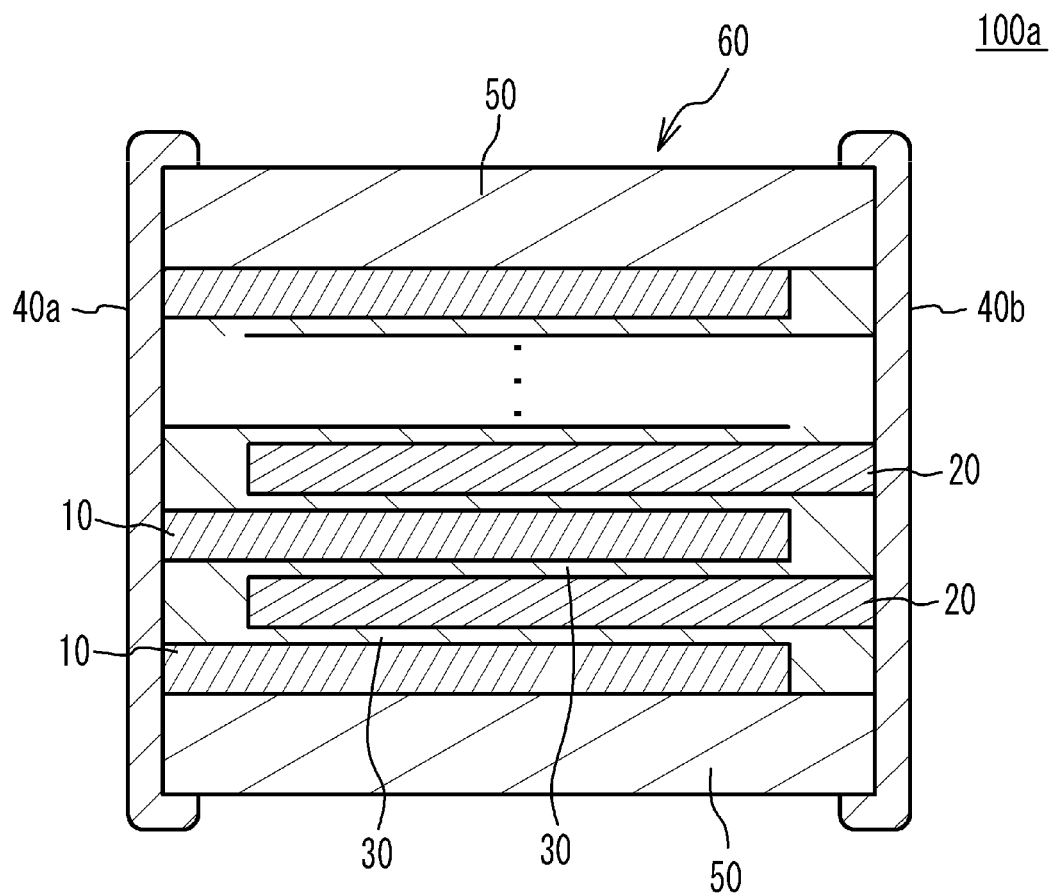
FIG. 8 schematically illustrates a cross sectional view of an all solid battery.

FIG. 8 illustrates a schematic cross section of an all solid battery 100a in which a plurality of cell units are stacked. The all solid battery 100a has a multilayer chip 60 having a rectangular parallelepiped shape. Each of a first external electrode 40a and a second external electrode 40b is provided directly on each of two side faces among four side faces which are other than an upper face and a lower face of the multilayer chip 60 in the stacking direction. The two side faces may be adjacent to each other. Alternatively, the two side faces may be face with each other. In the embodiment, the first external electrode 40a is provided on one of the two facing side faces (end faces), and the second external electrode 40b is provided on the other of the two facing side faces.

In the following description, the same numeral is added to each member that has the same composition range, the same thickness range and the same particle distribution range as that of the all solid battery 100. And, a detail explanation of the same member is omitted.

In the all solid battery 100a, each of the first internal electrodes 10 and each of the second internal electrodes 20 sandwich each of the solid electrolyte layer 30 and are alternately stacked. Edges of the first internal electrodes 10 are exposed to the first edge face of the multilayer chip 60 but are not exposed to the second edge face of the multilayer chip 60. Edges of the second internal electrodes 20 are exposed to the second edge face of the multilayer chip 60 but are not exposed to the first edge face. Thus, each of the first internal electrodes 10 and each of the second internal electrodes 20 are alternately conducted to the first external electrode 40a and the second external electrode 40b. The solid electrolyte layer 30 extends from the first external electrode 40a to the second external electrode 40b. In this way, the all solid battery 100a has a structure in which a plurality of cell units are stacked.

A cover layer 50 is stacked on an upper face (in FIG. 8, on the upper face of the uppermost internal electrode) of a stacked structure of the first internal electrode 10, the solid electrolyte layer 30 and the second internal electrode 20. Another cover layer 50 is stacked on a lower face (in FIG. 8, on the lower face of the lowermost internal electrode) of the stacked structure. A main component of the cover layer 50 is an inorganic material such as Al, Zr, Ti (for example, $Al_2O_3$, $ZrO_2$, $TiO_2$ or the like). The main component of the cover layer 50 may be the main component of the solid electrolyte layer 30.

Figure 9:
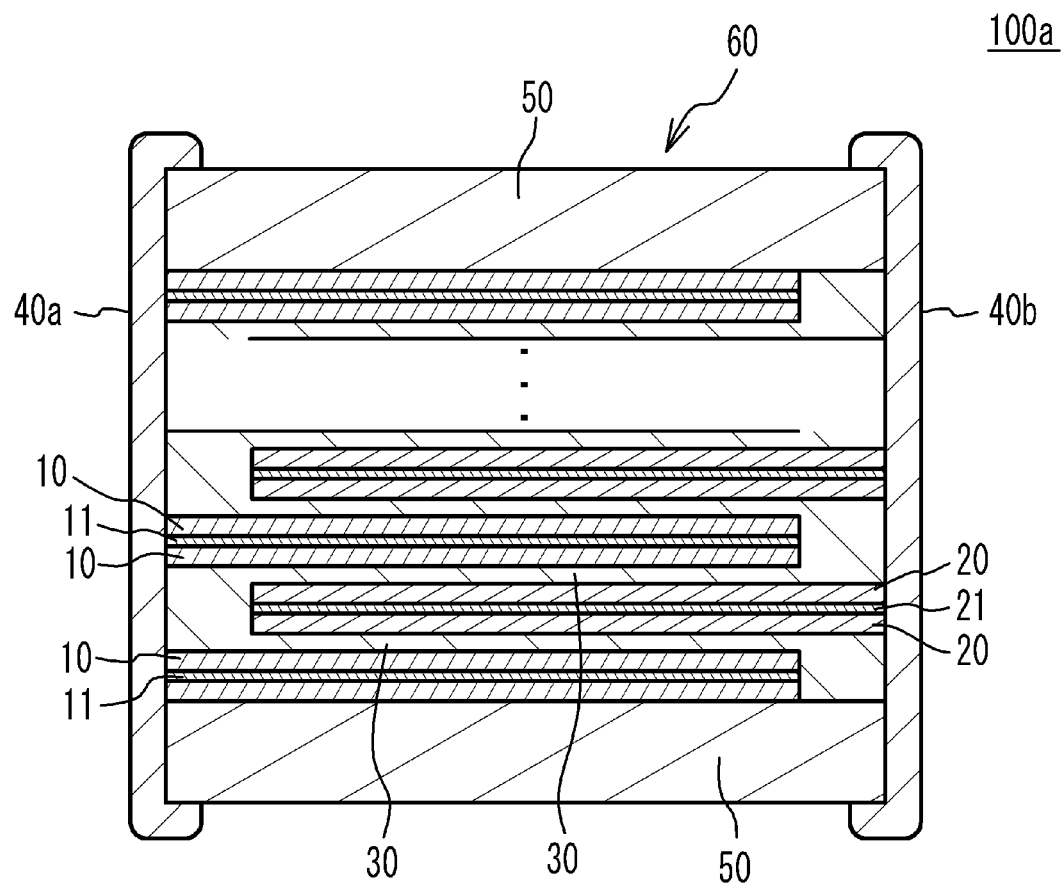
FIG. 9 schematically illustrates a cross sectional view of another all solid battery.

The first internal electrode 10 and the second internal electrode 20 may have an electric collector layer. For example, as illustrated in FIG. 9, a first electric collector layer 11 may be provided in the first internal electrode 10. A second electric collector layer 21 may be provided in the second internal electrode 20. A main component of the first electric collector layer 11 and the second electric collector layer 21 is a conductive material. For example, the conductive material of the first electric collector layer 11 and the second electric collector layer 21 may be such as a metal, carbon or the like. When the first electric collector layer 11 is connected to the first external electrode 40a and the second electric collector layer 21 is connected to the second external electrode 40b, current collecting efficiency is improved.

Figure 10:
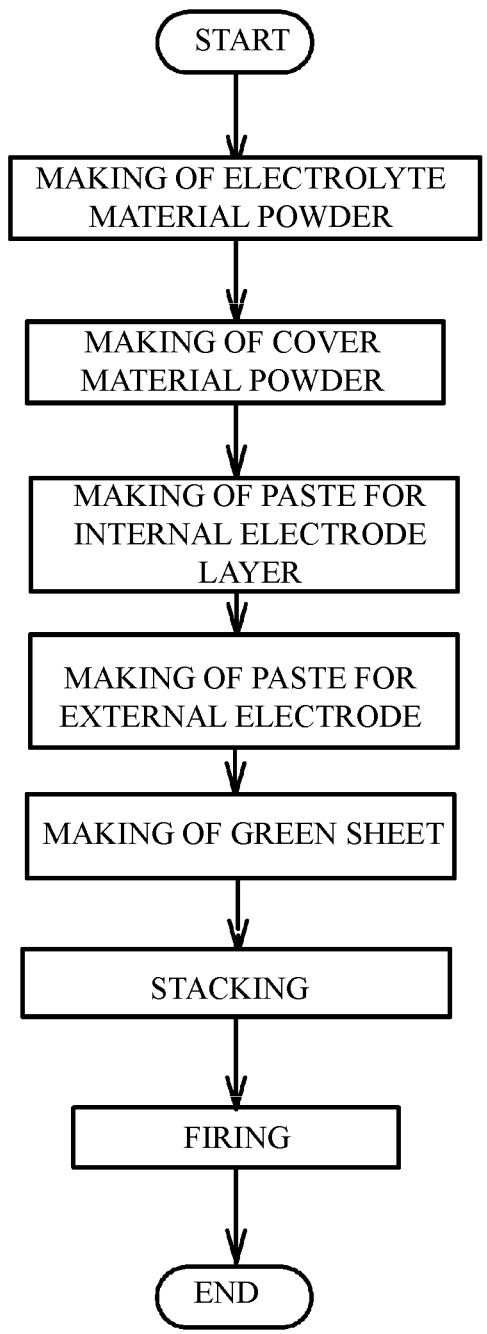
FIG. 10 illustrates a flowchart of a manufacturing method of an all solid battery.

A description will be given of a manufacturing method of the all solid battery 100a described in FIG. 8. FIG. 10 illustrates a flowchart of the manufacturing method of the all solid battery 100a.

(Making process of raw material powder for solid electrolyte layer) Raw material powder for forming the solid electrolyte layer 30 is made. For example, it is possible to make the raw material powder for forming the solid electrolyte layer 30, by mixing raw material and additives and using solid phase synthesis method or the like. The resulting powder is subjected to dry grinding. Thus, a grain diameter of the resulting power is adjusted to a desired one. For example, the diameter is adjusted to the desired one with use of planetary ball mil using $ZrO_2$ balls of 5 mmφ.

(Making process of raw material powder for cover layer) Raw material powder of ceramic for forming the cover layer 50 is made. For example, it is possible to make the raw material powder for forming the cover layer 50, by mixing raw material and additives and using solid phase synthesis method or the like. The resulting powder is subjected to dry grinding. Thus, a grain diameter of the resulting power is adjusted to a desired one. For example, the diameter is adjusted to the desired one with use of planetary ball mil using $ZrO_2$ balls of 5 mmφ.

(Making process of paste for internal electrode) Next, paste for internal electrode is made in order to make the first internal electrode 10 and the second internal electrode 20. For example, a conductive auxiliary agent, an electrode active material, a solid electrolyte material, a sintering assistant, a binder, a plasticizer and so on are evenly dispersed into water or organic solvent. Thus, paste for internal electrode is obtained. The above-mentioned solid electrolyte paste may be used as the solid electrolyte material. A carbon material may be used as the conductive auxiliary agent. A metal may be used as the conductive auxiliary agent. The metal may be Pd, Ni, Cu, Fe, or alloy thereof. Pd, Ni, Cu, Fe, or alloy thereof, or a carbon material may be used as the conductive auxiliary agent. When the composition of the first internal electrode 10 is different from that of the second internal electrode 20, paste for internal electrode used for the first internal electrode 10 and another paste for internal electrode used for the second internal electrode 20 may be individually made.

The sintering assistant of the paste for internal electrode may include one or more glass components such as Li—B—O-based compound, Li—Si—O-based compound, Li—C—O-based compound, Li—S—O-based compound, or Li—P—O-based compound.

(Making process of paste for external electrode) Next, paste for forming the first external electrode 40a and the second external electrode 40b is made. For example, a conductive material, a glass frit, a binder, a plasticizer and so on are evenly dispersed into aqueous solvent or organic solvent. Thus, the paste for external electrode is obtained.

(Making process of solid electrolyte green sheet) The raw material powder for solid electrolyte layer is evenly dispersed into aqueous solvent or organic solvent together with a binding agent, a dispersing agent, a plasticizer and so on. The resulting power is subjected to wet crushing. And solid electrolyte slurry having a desired particle diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is painted. Thus, a solid electrolyte green sheet 51 is obtained. The painting method is not limited. For example, a slot die method, a reverse coat method, a gravure coat method, a bar coat method, a doctor blade method or the like may be used. It is possible to measure the particle size distribution after the wet-crushing, by using a laser diffraction measurement device using a laser diffraction scattering method.

Figure 11A:
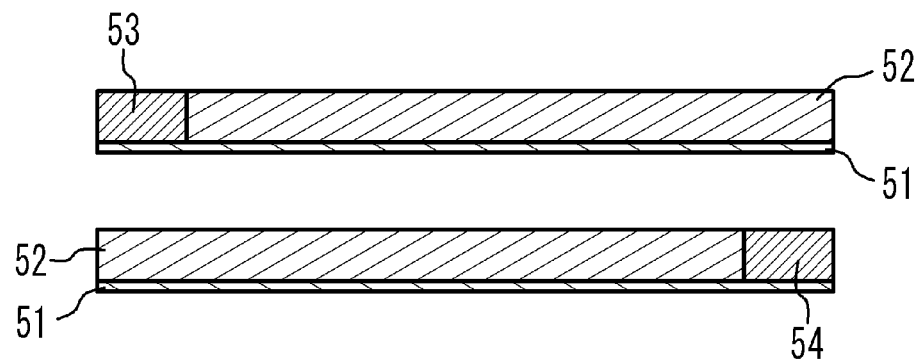
FIG. 11A and FIG. 11B illustrate a stacking process.
Figure 11B:
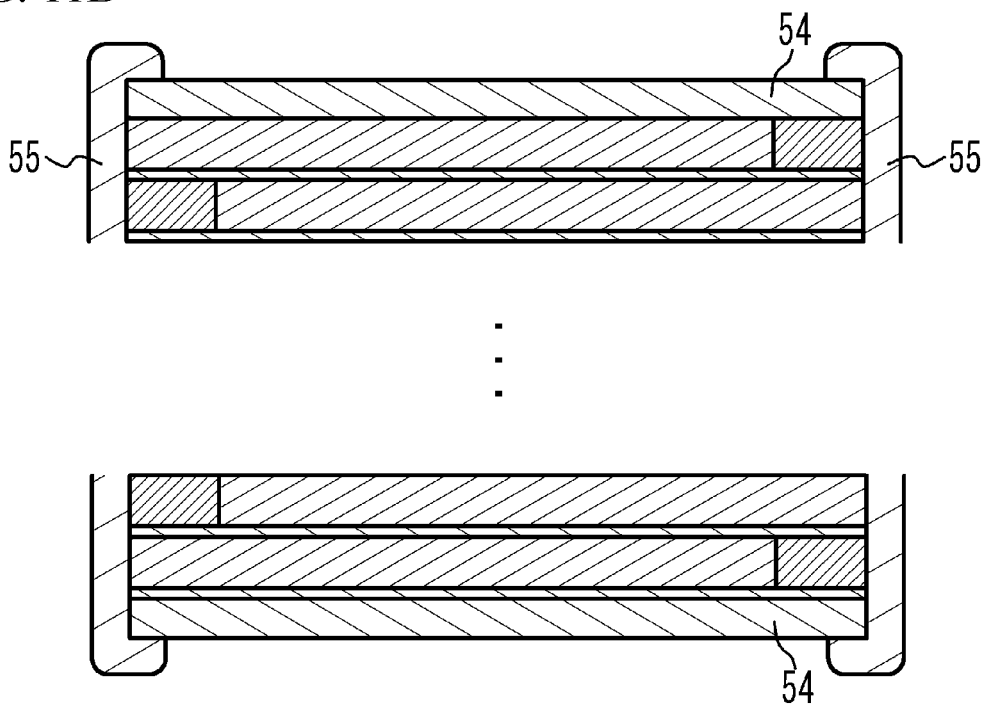

(Stacking process) Paste 52 for internal electrode is printed on one face of the solid electrolyte green sheet 51 as illustrated in FIG. 11A. A thickness of the paste 52 is equal to or more than a thickness of the solid electrolyte green sheet 51. A reverse pattern 53 is printed on a part of the solid electrolyte green sheet 51 where the paste 52 is not printed. A material of the reverse pattern 53 may be the same as that of the solid electrolyte green sheet 51. The solid electrolyte green sheets 51 after printing are stacked so that each of the solid electrolyte green sheets 51 is alternately shifted to each other. Cover sheets 54 are stacked are clamped from an upper side and a lower side of the stacking direction. Thus, a multilayer structure is obtained. In this case, in the multilayer structure, the paste 52 is alternately exposed to the two end faces of the multilayer structure having a parallelepiped shape. It is possible to make the cover sheet 54 by painting the raw material for cover sheet with use of the same method as the solid electrolyte cover sheet. The thickness of the cover sheet 54 is larger than that of the solid electrolyte green sheet 51. A single cover sheet may have a large thickness. Alternatively, a plurality of painted sheets may be stacked.

Next, the two end faces are coated with paste 55 for external electrode by dipping method or the like. After that, the paste 55 is dried. Thus, a compact for forming the all solid battery 100a is obtained.

(Firing process) Next, the obtained multilayer structure is fired. In the firing process, it is preferable that a maximum temperature is 400 degrees C. to 1000 degrees C. in oxidizing atmosphere or non-oxidizing atmosphere. It is more preferable that that maximum temperature is 500 degrees C. to 900 degrees C. In order to sufficiently remove the binder until the maximum temperature, a process for keeping a temperature lower than the maximum temperature in oxidizing atmosphere may be performed. It is preferable that the firing is performed in the lowest possible temperature, from a viewpoint of reduction of the process cost. After the firing, a re-oxidizing process may be performed. In this manner, the all solid battery 100a is manufactured.

When paste for internal electrode, paste for electric collector including a conductive material, and another paste for internal electrode are stacked in this order, the electric collector layer can be formed in the first internal electrode 10 and the second internal electrode 20.

Examples

All solid batteries in accordance with the above-mentioned embodiment were made. And characteristic of the all solid batteries was measured.

(Example 1) Two types of positive electrode active materials, $LiCoPO_4$ and $Li_6Co_5(P_2O_7)_4$, acetylene black acting as a conductive auxiliary agent, and solid electrolyte LAGP (Li—Al—Ge—$PO_4$-based) were mixed and grinded with a weight ratio of 50:5:10:35. The mixed materials were kneaded together with a binder, a dispersant, and an organic solvent. Thus, positive electrode paste was made. A positive electrode layer was formed on a LAGP sintered pellet having a diameter Φ of 15 mm, by painting the positive electrode paste. The positive electrode layer was fired at 650 degrees C. in inert atmosphere. After that, an Au electric collector was formed on the positive electrode by sputtering. A metal Li was formed on an opposite pole through a polymer electrolyte film made of polyethylene oxide and LiTFSI (lithium Bis (trifluoromethane) sulfone imide) in a glove box of argon atmosphere. And the positive electrode half-cell was sealed in a 2032 type coin cell.

(Example 2) The positive electrode active material was $LiCoPO_4$, $Li_6Co_5(P_2O_7)_4$ and $Li_2CoP_2O_7$. Moreover, acetylene black and LAGP were added. The weight ratio was 45:5:5:10:35. Other conditions were the same as those of the example 1. And a positive electrode half-cell was made. Two steps of the potential terrace were observed in both the charge and discharge, as well as the example 1. However, the second potential is flatter than that of the example 1. Therefore, the example 2 was adequate for detecting the end point voltage.

(Comparative example 1) The positive electrode active material was only $LiCoPO_4$. Moreover, acetylene black and LAGP were added. The weight ratio was 50:10:35. Other conditions were the same as those of the example 1. A positive half-cell was made.

(Comparative example 2) The positive electrode active material was $Li_6Co_5(P_2O_7)_4$. Other conditions were the same as those of the comparative example 1. A positive electrode half-cell was made.

(Comparative example 3) The positive electrode active material was $Li_2CoP_2O_7$, acetylene black acting as a conductive auxiliary agent, and LAGP acting as a solid electrolyte. The composition ratio was 50:5:10:35. Other conditions were the same as those of the example 1. A positive half-cell was made.

(Analysis) The half-cells of the examples 1 and 2 and the comparative examples 1 to 3 were subjected to a charge/discharge measurement at a constant current within 3.0 V to 5.2 V in a thermostatic chamber at 80 degrees C. Table 1 shows the results. In the example 1, two potential terraces were observed during the charge and discharge. During the discharge, near the end point, the potential terrace at a capacity which was approximately 1/10 of the whole capacity was observed near 4.6 V vs $Li/Li^+$. It was determined that the potential terrace was appropriate for the end point detecting. In the example 2, two potential terraces were observed during the charge and discharge, as well as the example 1. The second potential terrace of the example 2 was flatter than the second potential terrace of the example 1. It was therefore determined that the second potential terrace of the example 2 was appropriate for the end point detecting. From the results, when the positive electrode includes two types of positive electrode active materials of which the average operation potentials are different from each other, two potential terraces clearly appear. When the positive electrode includes $Li_2CoP_2O_7$, it is possible to clearly detect the second potential terrace.

On the other hand, in the comparative example 1, two potential terraces were observed near 4.8 V to 5.0 V during the discharge and the charge. However, it was determined that the second potential terrace of the discharge curve was not appropriate for the end point detecting, because the voltage difference was small and the step appeared at approximately a half of the capacity. In the comparative example 2, a single potential terrace was observed near 4.6 V during the charge and the discharge. However, the voltage rapidly decreased near the end point of the discharge. It was determined that it was difficult to detect the end point. In the comparative example 3, a single potential terrace was observed near 4.9 V during the discharge and the charge. However, the voltage rapidly decreased near the end point of the discharge. It was determined that it was difficult to detect the end point.

TABLE 1

| | POSITIVE ELECTRODE ACTIVE MATERIAL | | | SECOND POTENTIAL TERRACE |
|---|---|---|---|---|
| EXAMPLE 1 | $LiCoPO_4$ | $Li_6Co_5(P_2O_7)_4$ | — | OBSERVED |
| EXAMPLE 2 | $LiCoPO_4$ | $Li_6Co_5(P_2O_7)_4$ | $Li_2CoP_2O_7$ | OBSERVED |
| COMPARATIVE EXAMPLE 1 | $LiCoPO_4$ | — | — | NONE |
| COMPARATIVE EXAMPLE 2 | $Li_6Co_5(P_2O_7)_4$ | — | — | NONE |
| COMPARATIVE EXAMPLE 3 | $Li_2CoP_2O_7$ | — | — | NONE |

(Example 3) Two type of negative electrode active materials, $TiO_2$ and $LiTi_2(PO_4)_3$, acetylene black acting as a conductive auxiliary agent, and solid electrolyte LAGP (Li—Al—Ge—$PO_4$-based) were mixed and grinded with a weight ratio of 50:5:10:35. The mixed materials were kneaded together with a binder, a dispersant, and an organic solvent. Thus, negative electrode paste was made. A negative electrode layer was formed on a LAGP sintered pellet having a diameter Φ of 15 mm, by painting the negative electrode paste. The negative electrode layer was fired at 600 degrees C. in inert atmosphere. After that, an Au electric collector was formed on the negative electrode by sputtering.

$LiCoPO_4$ acting as a positive electrode active material, acetylene black acting as a conductive auxiliary agent, and solid electrolyte LAGP were mixed and grinded with a weight ratio of 55:10:35. The mixed materials were kneaded together with a binder, a dispersant, and an organic solvent. Thus, positive electrode paste was made. A positive electrode layer was formed on a LAGP sintered pellet having a diameter Φ of 15 mm, by painting the positive electrode paste. The positive electrode layer was fired at 600 degrees C. in inert atmosphere. After that, an Au electric collector was formed on the negative electrode by sputtering. In this case, an amount of the painted positive electrode layer was adjusted so that a theoretical capacity calculated from the amount of the positive electrode active material was 1.3 times as a theoretical capacity calculated from a total amount of the negative electrode active material.

After that, the positive electrode layer and the negative electrode layer were located through a polymer electrolyte film made of polyethylene oxide and LiTFSI (lithium Bis (trifluoromethane) sulfone imide) in a glove box of argon atmosphere. And the all solid battery was sealed in a 2032 type coin cell.

(Example 4) Two types of negative electrode active materials which were $LiTiOPO_4$ and $LiTi_2(PO_4)_3$ were used in the negative electrode paste. Other conditions were the same as those of the example 3.

(Example 5) Two types of negative electrode active materials which were $TiO_2$ and $Li_{1.3}Al_{0.3}Ti_{1.7}(PO_4)_3$ were used in the negative electrode paste. Other conditions were the same as those of the example 3.

(Example 6) Two types of negative electrode active materials which were LiTiOPO$_4$ and Li$_{1.3}$Al$_{0.3}$Ti$_{1.7}$(PO$_4$)$_3$ were used in the negative electrode paste. Other conditions were the same as those of the example 3.

(Example 7) Two types of negative electrode active materials which were Li$_{0.33}$La$_{0.55}$TiO$_3$ and LiTi$_2$(PO$_4$)$_3$ were used in the negative electrode paste. Other conditions were the same as those of the example 3.

(Example 8) Two types of negative electrode active materials which were Li$_{0.33}$La$_{0.55}$TiO$_3$ and Li$_{1.3}$Al$_{0.3}$Ti$_{1.7}$(PO$_4$)$_3$ were used in the negative electrode paste. Other conditions were the same as those of the example 3.

(Comparative example 4) The negative electrode active material was only TiO$_2$. Moreover, acetylene black and LAGP were added. The weight ratio was 50:10:35. Other conditions were the same as those of the example 3.

(Comparative example 5) LiTiOPO$_4$ was used as the negative electrode active material. Other conditions were the same as those of the comparative example 4.

(Comparative example 6) The negative electrode active material was Li$_{0.33}$La$_{0.55}$TiO$_3$. Other conditions were the same as those of the comparative example 4.

(Analysis) The all solid battery of the examples 3 to 8 and the comparative examples 4 to 6 were subjected to a charge/discharge measurement at a constant current within 1.0 V to 3.7 V in a thermostatic chamber at 80 degrees C. Table 1 shows the results. In the example 3, two potential terraces were observed during the charge and discharge. During the discharge, near the end point, the potential terrace at a capacity which was approximately 1/10 of the whole capacity was observed near 2.4 V vs Li/Li$^+$. It was determined that the potential terrace was appropriate for the end point detecting. In the example 4, two potential terraces were observed during the charge and discharge, as well as the example 3. During the discharge, near the end point, the potential terrace at a capacity which was approximately 1/10 of the whole capacity was observed near 2.4 V vs Li/Li$^+$. During the discharge, near the end point, the potential terrace at a capacity which was approximately 1/10 of the whole capacity was observed near 2.4 V vs Li/Li$^+$. It was determined that the example 4 was appropriate for the end point detecting. In the example 5, two potential terraces were observed during the charge and discharge, as well as the example 3. During the discharge, near the end point, the potential terrace at a capacity which was approximately 1/10 of the whole capacity was observed near 2.4 V vs Li/Li$^+$. It was determined that the example 5 was appropriated for the end point detecting. In the example 6, two potential terraces were observed during the charge and discharge, as well as the example 3. During the discharge, near the end point, the potential terrace at a capacity which was approximately 1/10 of the whole capacity was observed near 2.4 V vs Li/Li$^+$. It was determined that the example 6 was appropriated for the end point detecting. In the example 6, two potential terraces were observed during the charge and discharge, as well as the example 3. During the discharge, near the end point, the potential terrace at a capacity which was approximately 1/10 of the whole capacity was observed near 2.4 V vs Li/Li$^+$. It was determined that the example 6 was appropriated for the end point detecting. In the example 8, two potential terraces were observed during the charge and discharge, as well as the example 3. During the discharge, near the end point, the potential terrace at a capacity which was approximately 1/10 of the whole capacity was observed near 2.4 V vs Li/Li$^+$. It was determined that the example 8 was appropriated for the end point detecting. From the results, when the negative electrode includes two types negative electrode materials of which the average operation potentials are different from each other, two potential terraces clearly appear.

On the other hand, in the comparative example 4, a single potential terrace was observed around 3.0V during the discharge and the charge. Near the end point, the voltage rapidly decreased. It was therefore determined that the end point detecting was difficult. In the comparative example 5, a single potential terrace was observed around 3.3 V during the discharge and the charge. Near the end point, the voltage rapidly decreased. It was therefore determined that the end point detecting was difficult. In the comparative example 6, a single potential terrace was observed around 3.1 V during the discharge and the charge. Near the end point, the voltage rapidly decreased. It was therefore determined that the end point detecting was difficult.

TABLE 2

| | NEGATIVE ELECTRODE ACTIVE MATERIAL | | SECOND POTENTIAL TERRACE |
|---|---|---|---|
| EXAMPLE 3 | TiO$_2$ | LiTi$_2$(PO$_4$)$_3$ | OBSERVED |
| EXAMPLE 4 | LiTiOPO$_4$ | LiTi$_2$(PO$_4$)$_3$ | OBSERVED |
| EXAMPLE 5 | TiO$_2$ | Li$_{1.3}$Al$_{0.3}$Ti$_{1.7}$(PO$_4$)$_3$ | OBSERVED |
| EXAMPLE 6 | LiTiOPO$_4$ | Li$_{1.3}$Al$_{0.3}$Ti$_{1.7}$(PO$_4$)$_3$ | OBSERVED |
| EXAMPLE 7 | Li$_{0.33}$La$_{0.55}$TiO$_3$ | LiTi$_2$(PO$_4$)$_3$ | OBSERVED |
| EXAMPLE 8 | Li$_{0.33}$La$_{0.55}$TiO$_3$ | Li$_{1.3}$Al$_{0.3}$Ti$_{1.7}$(PO$_4$)$_3$ | OBSERVED |
| COMPARATIVE EXAMPLE 4 | TiO$_2$ | — | NONE |
| COMPARATIVE EXAMPLE 5 | LiTiOPO$_4$ | — | NONE |
| COMPARATIVE EXAMPLE 6 | Li$_{0.33}$La$_{0.55}$TiO$_3$ | — | NONE |

Although the embodiments of the present invention have been described in detail, it is to be understood that the various change, substitutions, and alterations could be made hereto without departing from the spirit and scope of the invention.

What is claimed is:

1. An all solid battery comprising:
   an oxide solid electrolyte layer;
   a positive electrode layer that is provided on a first main face of the oxide-based solid electrolyte layer and includes a positive electrode active material; and
   a negative electrode layer that is provided on a second main face of the oxide-based solid electrolyte layer and includes a negative electrode active material,
   wherein the positive electrode active material includes a first electrode active material and a second electrode active material,
   wherein the average operation potential vs Li/Li$^+$ of the first electrode active material is higher than the average operation potential vs Li/Li$^+$ of the second electrode active material,
   wherein, in a cross section of the positive electrode layer, an area ratio of the first electrode active material with respect to a total area of the first electrode active material and the second electrode active material is 85% or more, and
   wherein, in the cross section of the positive electrode layer, an area ratio of the second electrode active material with respect to the total area of the first electrode active material and the second electrode active material is 5% or more,
   wherein the first electrode active material is LiCoPO$_4$, wherein the second electrode active material is $Li_6Co_5(P_2O_7)_4$;
wherein, in the cross section of the positive electrode layer, the area ratio of the first electrode active material is larger than the area ratio of the second electrode active material, and
wherein, in the positive electrode layer, a weight ratio of the first electrode active material is 9 times or more and 10 times or less than a weight ratio of the second electrode active material.

2. The all solid battery as claimed in claim 1,
wherein a difference of the average operation potential vs $Li/Li^+$ of the first positive electrode active material and the average operation potential vs $Li/Li^+$ of the second positive electrode active material is 0.2 V or more and 1.5 V or less.

3. The all solid battery as claimed in claim 1, wherein an average crystal grain diameter of the second electrode active material is 0.5 μm or more and 50 μm or less.

4. The all solid battery as claimed in claim 1, wherein the positive electrode layer includes $Li_2CoP_2O_7$.

5. The all solid battery as claimed in claim 1,
wherein the negative electrode layer includes a first negative electrode active material and a second negative electrode active material,
wherein the average operation potential vs $Li/Li^+$ of the first negative electrode active material is 1.9 V or less, and
wherein the average operation potential vs $Li/Li^+$ of the second negative electrode active material is 2.2 V or more.

6. The all solid battery as claimed in claim 5, wherein the first negative electrode active material is one of $TiO_2$, $Li_{1-2x}M_xTiOPO_4$, $Li_{3x}La_{2/3-x}TiO_3$, and $Nb_2O_5$,
wherein M is a metal element of which a valence is 2, and $0 \leq x \leq 0.5$.

7. The all solid battery as claimed in claim 5, wherein the second negative electrode active material is phosphoric acid salt including Ti and having a NASICON type crystal structure, or $TiP_2O_7$.

8. The all solid battery as claimed in claim 7, wherein the phosphoric acid salt including Ti is $Li_{1+y}A_yTi_{2-y}(PO_4)_3$,
wherein A is a metal element of which a valence is 3, and $0 \leq y \leq 0.7$.

9. The all solid battery as claimed in claim 8, wherein an average crystal grain diameter of the second negative electrode active material is 0.5 μm or more and 50 μm or less.

* * * * *